United States Patent
McLaughlin et al.

(10) Patent No.: US 9,325,824 B2
(45) Date of Patent: Apr. 26, 2016

(54) ADJUSTABLE HOLDER FOR PORTABLE COMMUNICATION DEVICE WITH SOUND ENHANCEMENT

(71) Applicant: Signal Essence, LLC, Mountain View, CA (US)

(72) Inventors: Hugh Joseph McLaughlin, Mountain View, CA (US); Caleb Henry Crome, San Jose, CA (US); Niall Macken, Santa Cruz, CA (US); Paul Michael McLaughlin, Mountain View, CA (US); Robert Kung-ning Yu, Mountain View, CA (US)

(73) Assignee: Signal Essence, LLC, Mountain View, CA (US)

( * ) Notice: Subject to any disclaimer, the term of this patent is extended or adjusted under 35 U.S.C. 154(b) by 71 days.

(21) Appl. No.: 14/199,742

(22) Filed: Mar. 6, 2014

(65) Prior Publication Data
US 2015/0189048 A1    Jul. 2, 2015

Related U.S. Application Data

(60) Provisional application No. 61/923,130, filed on Jan. 2, 2014.

(51) Int. Cl.
*H04B 1/38* (2015.01)
*H04M 1/60* (2006.01)
*H04M 1/215* (2006.01)
*H04M 1/04* (2006.01)
*H04M 1/05* (2006.01)

(52) U.S. Cl.
CPC .............. *H04M 1/6041* (2013.01); *H04M 1/04* (2013.01); *H04M 1/2155* (2013.01); *H04M 1/05* (2013.01); *H04M 1/6075* (2013.01)

(58) Field of Classification Search
CPC ....... H04M 1/2155; H04M 1/04; H04M 1/05; H04M 1/6041
USPC ........ 455/575.1, 566, 569.1, 575.6, 90.3, 347
See application file for complete search history.

(56) References Cited

U.S. PATENT DOCUMENTS

| | | | | |
|---|---|---|---|---|
| 7,818,034 | B2 * | 10/2010 | Richards ................... | A45F 5/02 379/447 |
| 2002/0009195 | A1 | 1/2002 | Schon | |
| 2002/0043545 | A1 * | 4/2002 | Tang ......................... | A45F 5/00 224/600 |
| 2006/0058073 | A1 * | 3/2006 | Kim ..................... | H04B 1/3877 455/573 |

* cited by examiner

*Primary Examiner* — Tuan Pham
(74) *Attorney, Agent, or Firm* — Fountainhead Law Group P.C.

(57) ABSTRACT

A holder for a mobile phone includes a body having an opening to receive the mobile phone and having a bottom. The holder further includes a latch coupled to the body for holding the holder with the opening up; and includes rear walls, side walls and a front wall that includes an opening that corresponds to the screen of the mobile phone and includes a mechanism to force the mobile phone to press against the front wall to create a cavity of air between the rear of the mobile phone and the back of the holder, where the top of the cavity is open to allow sound to propagate from near the bottom of the mobile phone through the top thereby amplifying the sound making the sound propagate primarily in an upward direction. The holder also has a clip mechanism feature that uses upward tilted teeth that bite on the front side of a seat belt to allow secure holding even when the user is withdrawing their mobile phone from the holder.

17 Claims, 13 Drawing Sheets

ADJUSTABLE HOLDER FOR PORTABLE COMMUNICATION DEVICE WITH SOUND ENHANCEMENT

CROSS REFERENCE TO RELATED APPLICATIONS

The present disclosure claims priority to U.S. Provisional App. No. 61/923,130 filed Jan. 2, 2014, the content of which is incorporated herein by reference in its entirety for all purposes.

BACKGROUND

Embodiments of the present disclosure generally relate to portable communication devices, and more particularly relate to a holder for holding a portable communication device for ease of use of the portable communication device.

Mobile phones, such as smartphones, are used in a variety of environments for communication. Numerous environments in which mobile phones are used require essentially hands free operation of the mobile phones for safe use. One environment in which hands free use of mobile phones is increasing is the automobile environment in which a driver of an automobile may be required to operate the automobile with minimal handling and minimal visual interaction with the mobile phone while driving. Numerous governments have legislation requiring hands free use of mobile phones while driving automobiles and drivers have generally become aware that essentially hands free use of mobile phones while driving improves safe driving.

Various devices provide a limited solution for hands free use of mobile phones while driving. Some of the devices that provide for hands free use of mobiles phones while driving include: i) wired headsets that include microphones and relatively small speakers (e.g., transducers) that fit into or onto a user's ear; ii) wireless headsets, such as Bluetooth devices; iii) a hands-free wireless speakerphone, such as a Bluetooth device that mounts either on the dashboard or the sun visor; iv) a hands-free factory-installed Bluetooth speakerphone device; and v) a hands-free kit designed to dock a mobile phone where the hands-free kit provides a relatively large speaker and a directional microphone; and vi) and a holder that acoustically couples the loudspeaker of the cell phone into an acoustic horn that is designed to mount to a windshield or to an air vent.

Each of these devices has specific limitations in providing its intended function. For example, wired headsets are cumbersome to handle. A wired headset includes a headset plug that needs to be plugged into a jack of a mobile phone, and includes an earpiece that needs to be positioned onto a user's ear. Wireless headsets similarly include an earpiece that needs to be positioned onto a user's ear, and have to be charged for use. Trying to put an ear piece onto one's ear while driving and trying to answer a call is difficult for many people and can therefore be very distracting. Further, making sure a wireless headset is charged for use is difficult for many users. Speakerphone devices often have microphone sensors that are placed relatively far (e.g., 30 centimeters or more) from a user's mouth. Considering an automobile's noisy environment, there is typically a relatively large amount of noise that is picked up by the microphones of the speakerphone device. Further a speakerphone kit needs to be installed and can be expensive. In the case of the holder with an acoustic horn, the present art teaches that the holder should be attached to a windshield by suction cup, or mounted to an air vent, or attached to a dashboard. With a mobile phone docked in a relatively open space in an automobile, such as on a dash board, sound reaching a microphone of a mobile phone from the talker may be distorted from reflections inside the automobile and the background noise will be relatively large compared to the sound from the talker.

A known problem with mobile phones is that the loudspeakers are generally weak. The space available in a mobile phone for a loudspeaker's transducer is relatively small so the loudspeaker's transducer is neither powerful nor efficient. In an automobile, the sound output of typical mobile phones is relatively weak compared to the background noise.

Some accessory devices for playing "louder" sounds from a mobile phone utilize an acoustic horn to increase the loudness of the sound from the mobile phone. Acoustic horns are well known devices that have been used since the invention of the phonograph for playing sounds louder. An acoustic horn plays a sound louder by improving the impedance mismatch between a sound source, such as a transducer, and the air. Since the loudspeaker of a mobile phone has a small diaphragm, an improved acoustic impedance match is achieved by attaching an acoustic horn to the port of the mobile phone's loudspeaker. The result of attaching an acoustic horn to a loudspeaker is generally improved acoustic efficiency with a small horn "amplifying" high frequencies and a large horn "amplifying" low frequencies. U.S. Patent Publication No. US 2002/0009195 to Schon describes a mobile phone holder that includes a forward-directed acoustic horn to enhance the sound emitted from a loudspeaker port of a mobile phone. The forward-directed acoustic horn of Schon primarily directs sound forward from Schon's mobile phone holder, which provides beneficial sound direction for a listener positioned with Schon's mobile phone holder facing the listener.

U.S. Pat. No. 8,428,665 to McLaughlin describes a mobile phone holder that has a horn that mates to the loudspeaker port of a mobile phone. In that holder, the sound is routed from the bottom of the mobile phone upward toward the listener's ears when it is clipped onto a seat belt. Horns generally require accurate placement of the mobile phone into the holder to mate with the horn to efficiently transfer the sound energy. Mobile phones usually have a protective case that can make the connection to the acoustic horn very leaky, decreasing the efficiency of the sound enhancement. This makes it very difficult to design a holder that can fit a multitude of different cases even for the same mobile phone. Acoustic horns generally need to be large compared to the mobile phone in order to achieve efficiency with frequencies below 1000 Hz. This causes the acoustic horn to take up additional space making the holder bulky and unattractive.

Additional problems exist with using mobile phones while driving, such as diverting one's eyes to the mobile phone to operate the mobile phone's buttons. Many mobile phones, such as smart phones, have very few hard buttons that a user may use for tactilely guiding the user's fingers to the hard buttons without having to look at the hard button. A hard button is a traditional button, such as a mechanical button, an electromechanical button, or the like. In contrast, many mobile phones, especially "smart phones" only have soft buttons that do not provide any tactile guidance for locating the soft buttons and generally requiring being looked at to locate the soft buttons symbol. A soft button is a button displayed on a touch screen and may be activated by touch. One example of a soft button is a mute control soft button that may be displayed on the touch screen of a smartphone where the mute control soft button may be touched by a user to mute the microphone of the smartphone. In U.S. Pat. No. 8,428, 665, finger guides are described for a holder so that a user may determine the location of the soft button icons by finger guides that provide a tactile pattern that can be felt by the user.

An additional problem with existing mobile phone holders is that it is necessary to look at the screen while attempting to access necessary buttons and screen icons.

Therefore, an impetus exists for creating a new device for mobile phone use in automobiles where the new device aids the user with hands-free operation of their mobile phone, provides for relatively clear sound emission, provides for relatively undistorted sound pick-up of a user's speech, and do so without a large horn, and do so with greater reliability when using a finger guides, and make it easy to remove the device from the holder.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, make apparent to those of skill in the art how embodiments in accordance with the present disclosure may be practiced. In the accompanying drawings.

DETAILED DESCRIPTION

Figure 1:
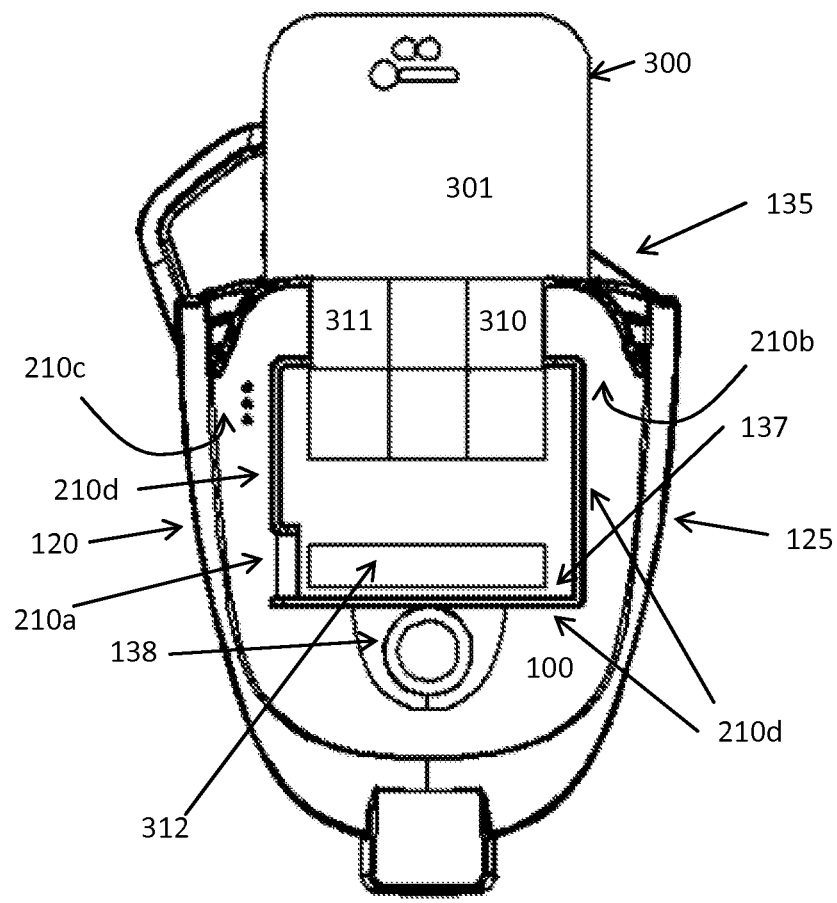
FIG. 1 is a front view of a holder according to one embodiment.

Embodiments of the present disclosure generally provide a holder for a portable communication device, and in particular provides a holder configured to hold a portable communication device relatively close to a user's body for relatively simple ergonomic use, eyes-free operation, and relatively improved sound quality.

In the following description, for purposes of explanation, numerous examples and specific details are set forth in order to provide a thorough understanding of the present disclosure. It will be evident, however, to one skilled in the art that the present disclosure as defined by the claims may include some or all of the features in these examples alone or in combination with other features described below, and may further include modifications and equivalents of the features and concepts described herein.

Mobile phones often have two microphones for detecting sound, such as a user's speech. A first microphone is often near a bottom of a mobile phone, and a second microphone is often near a top of the mobile phone. The first microphone at the bottom of the mobile phone may be used for detecting a user's voice with the mobile phone held near, or against, a side of a user's head ("normal" use position) with the first microphone proximate to the user's mouth. The second microphone is often used for "hands-free" talking where the mobile phone is not in the normal use position but is positioned away from a user's head. The first and the second microphones are often coordinated by the mobile phone's signal processor to reduce undesired noise detected by the microphones from being transmitted from the mobile phone in a mobile phone call.

Mobile phones also often include two transducers for producing sound. A first transducer is often near the top-front of a mobile phone and a second transducer is often on the lower back or bottom of the mobile phone. The first transducer is typically configured for use near a user's ear with the mobile phone near, or against, a person's head. The second transducer may be a loudspeaker that produces louder sounds than the first transducer and may be for speakerphone use. The two transducers are typically distant from the microphones to minimize problems with echo coming into the microphones. Generally, for a mobile phone to operate well, the mobile phone and the mobile phone's microphones may be configured to minimize echo of sound entering the microphones. It is typical that in "normal" mode the sound-making transducer is at the top of the phone near the user's ear, while the microphone is at the bottom. It is typical that in "speakerphone" mode, the positions are the opposite of "normal" mode, with the "speakerphone" loudspeaker near the bottom and the "speakerphone" microphone near the top. For some mobile phones such as the Apple iPhone line of phones, the speakerphone loudspeaker is at the bottom of the phone. For many other mobile phones, the speakerphone loudspeaker is on the back of the phone, but near the bottom. There is a strong advantage for the speakerphone loudspeaker to be at an edge or near an edge. If the speakerphone loudspeaker is completely centered in the back of the mobile phone then it will not sound good because the high frequencies will not propagate toward the users, so the high frequencies will be weaker and self-interfering.

Modern mobile phones are carefully engineered to produce a good speakerphone experience. The mobile phones generally run a sophisticated internal adaptive algorithm that cancels echo that is caused by sound that comes from the loudspeaker and enters the microphone. The algorithm is challenged by the fact that small changes in the acoustic path caused by change of position relative to objects such as hands and proximity to other surfaces, may result in echo or unwanted suppression of voice while the algorithm tries to prevent echo.

Another challenge for mobile phones is that there is very limited space for making an adequate loudspeaker. In a car, the noise level is very high and the sound level that can be achieved is barely loud enough for a comfortable listening.

Modern mobile phones are also referred to as smart phones. In general, a smart phone includes a touch sensitive display and one or more hardware buttons. A problem with smart phones is that some important functions can only be accessed by touching the display. This requires that the user visually locate the soft button icon and then pushes the soft button icon while looking at the device. This is a safety problem because this requires at least one hand and the use of the driver's eyes to complete a simple task. For example, the user might simply want to answer a call. With many mobile phones a call is answered with a simple gesture such as a swipe to open the phone for usage. However, without a tactile way of reliably accomplishing this task the user is forced to look at the phone to open the phone. In another example, if the user wishes to use the phone as a speakerphone, the user may be required to touch a soft icon to toggle the speakerphone "on". Again, the user is required to locate the soft icon visually and to touch the soft icon while visually looking at the phone.

The present disclosure describes a seat belt-attached holder that aids the performance of a mobile phone. The holder positions the speakerphone microphone closer to the user's mouth, holds the loudspeaker in a specific position to stabilize the echo path, amplifies the sound, directs the sound toward the user's head, and provides tactile features that direct the user's fingers from the device onto soft button icons located on the screen of the mobile phone.

Embodiments of the present disclosure allow for one-handed operation for user actions. The mobile phone is inserted into the holder (device, apparatus) by simply dropping or pushing the mobile phone into the top of the holder. Presuming the device is equipped with a button for initiating voice dialing, the user never has to look at the mobile phone to initiate a call. For receiving a call, the call is answered usually a swiping action to answer the call. Depending on the mobile phone, other controls such as speakerphone mode or mute may be controlled by a soft button icon. Embodiments of the present disclosure provide tactile guides that direct the user's fingers to the location of the soft button icon. In a particular embodiment described below the Apple® iPhone™ smart phone is used as an illustrative example of a mobile phone.

FIGS. 1, 2, 3, 4, 5 are schematics of a holder 100 configured to hold a mobile phone 300 according to one embodiment. Holder 100 may be attached to a seat belt, or the like, of an automobile to hold a mobile phone 300 while a user operates the automobile. For example, holder 100 may be attached to an over-the-shoulder seat belt that comes across a driver's chest. Holder 100 may alternatively be attached to part of a user's garment, such as a lapel, a placket, a shirt pocket, etc. Holder 100 may hold a mobile phone 300 relatively close to a user's body. Advantages of holding mobile phone 300 relatively close to a user's body are described in detail below.

Figure 2:
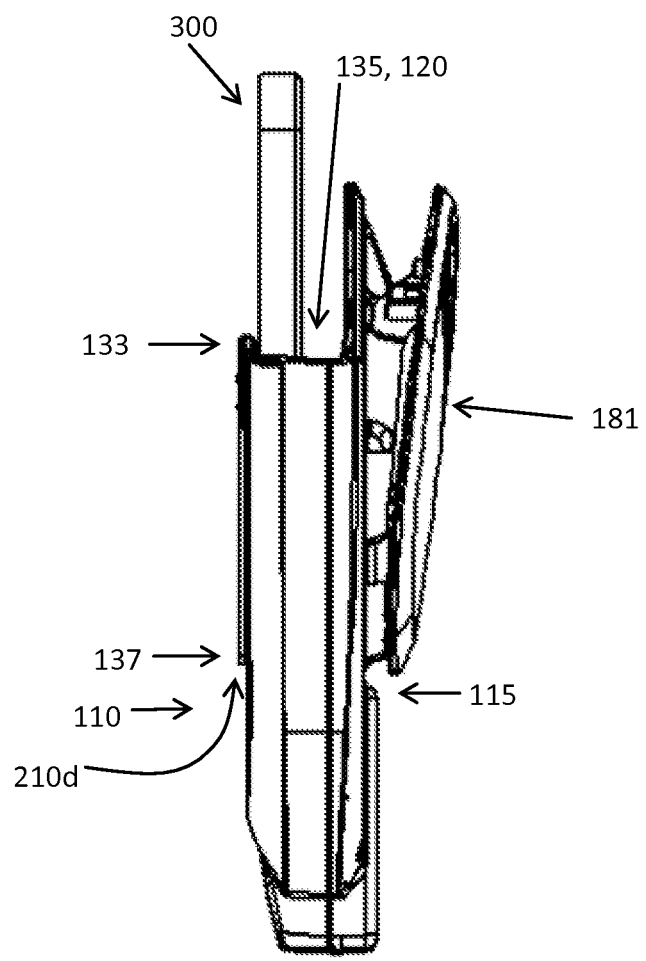
FIG. 2 is a side view of the holder according to one embodiment.
Figure 3:
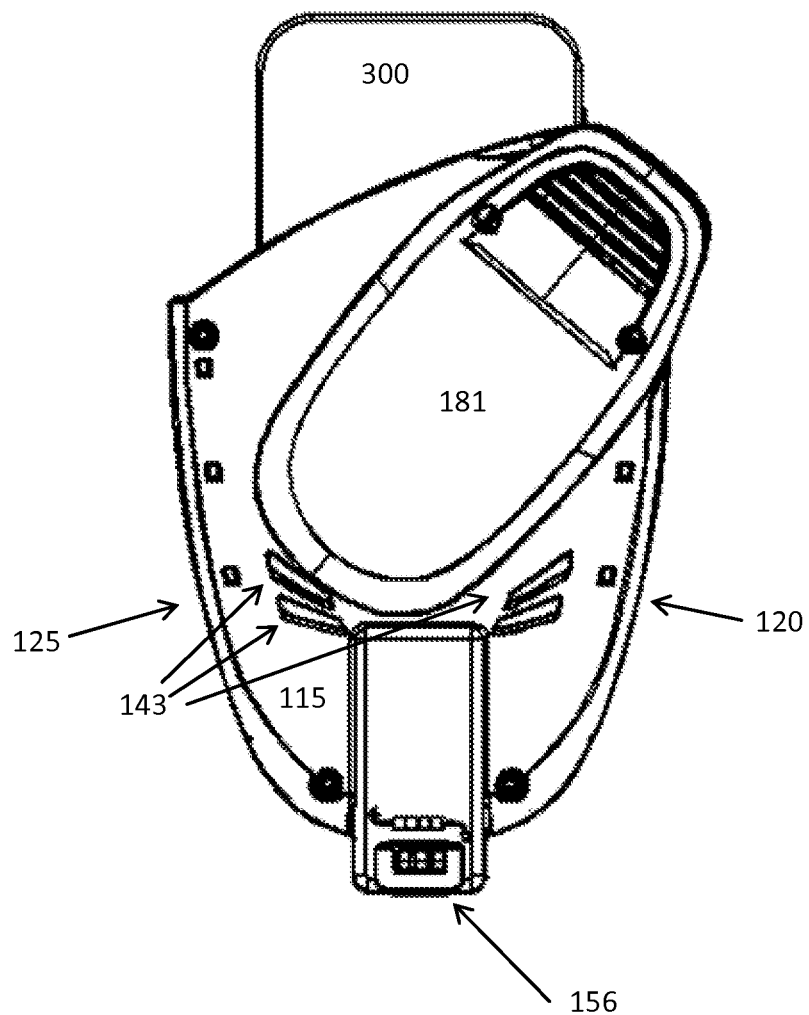
FIG. 3 is a rear view of the holder according to one embodiment.

FIG. 1 is front view of holder 100 with an Apple® iPhone 5 representing a mobile phone 300 inserted into the holder. FIG. 2 is a side view of holder 100 with the mobile phone 300 inserted. FIG. 3 is a rear view of holder 100. According to one embodiment, holder 100 includes a body where the body includes a front wall 110, a back wall 115, a right wall 120, a left wall 125, and a bottom interior wall 130 (collectively a set of walls). Left and right are defined by the perspective of the phone screen looking out. The walls may have a variety of thicknesses. For example, the thickness of the walls may be about 1.5 millimeters to 2.5 millimeters thick plastic. Front wall 110, back wall 115, right wall 120, left wall 125, and bottom wall 130 forms an opening 135, where opening 135 opens towards a top 133 of holder 100. Top 133 is at an opposite end of holder 100 relative to bottom wall 130, which is near the bottom 134 of holder 100. The dimensions and sizing of holder 100 may be selected to accommodate various designs of mobile phone.

In FIG. 3 is shown the rear view of one embodiment of the device. In this view the rear clip 181 is visible. The other features described in further detail below.

Figure 4:
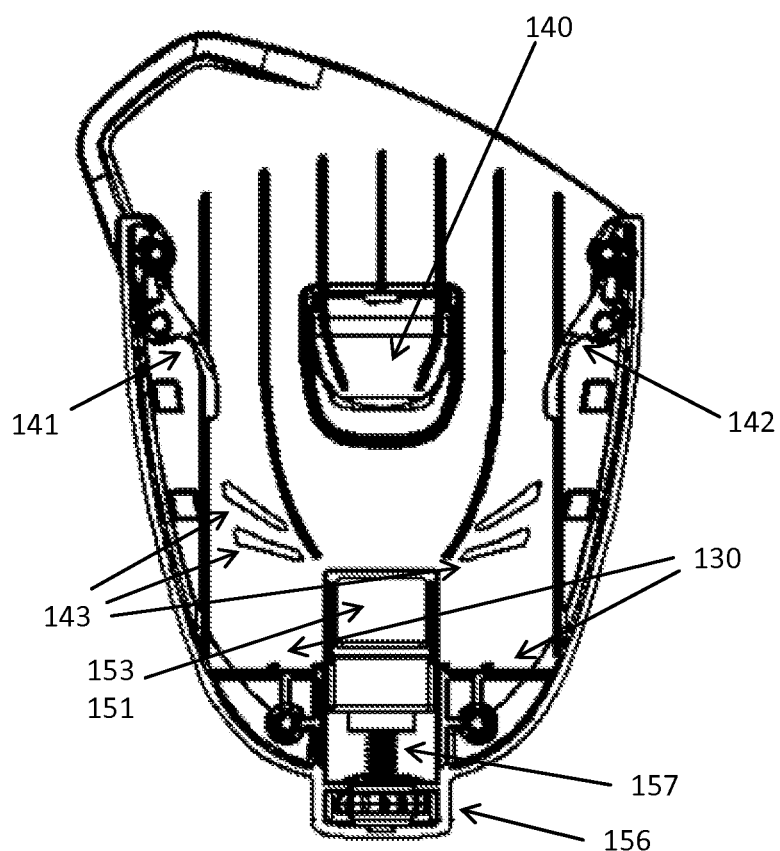
FIG. 4 is a cut-away front view of the holder according to one embodiment.

In this embodiment, the walls are formed by two plastic injection molded housing pieces that form the body portion of the device. In FIG. 4, the front housing is removed to show the interior features. In the interior, there is a rear located center louver 140 that that forces the top part of the mobile phone to press forward toward the front housing. There are two spring loaded side louvers 141 and 142 that center the mobile phone inside the device. The spring loading can be provided by either a metal spring or by a pad of resilient foam that acts as a spring. Between the interior bottom wall and the outside bottom wall is a housing area to hold an adjustment mechanism. The adjustment mechanism includes a dial 156, a screw 157, and a wedge 151 with inside threads to receive the screw. The dial 156 is held in place by the housing features to hold it in place. The wedge is allowed to move vertically in a vertical trench. The wedge is allowed to move through the bottom wall 130. Acoustically, the wedge has a tight fit to prevent sound from leaking past the bottom wall 130 into the adjustment mechanism housing. Although disclosed embodiments are suitable for the iPhone™ mobile phone by Apple, Inc., it will be appreciated that other embodiments may accommodate other mobile phone designs from other manufacturers.

Front wall 110 may have an opening in the front wall 110 formed therein where the opening extends from top 133 to a lower-mid portion 137 of front wall 110. This opening may have a width, which is the approximate width of the display 301 of mobile phone 300. In a particular embodiment, for example, the width of the opening may be the approximate width of a display of an iPhone™ mobile phone. Front wall 110 may include an aperture 138 formed therein and positioned to substantially register with a button of mobile phone 300. For example, aperture 138 formed in front wall 110 may be a substantially round hole configured to register with a front-center button of an iPhone™ mobile phone. Aperture 138 may have a variety of sizes and locations to substantially match the front-center buttons of various mobile phone designs. In other embodiments, front wall 110 may include a set of apertures formed therein, where the set of apertures register with the buttons of other mobile phone types. For example, the set of apertures may include four apertures that register with four control buttons that are common on the front of an Android™ mobile phone. Those of skill in the art will understand that other walls of holder 100 may include a variety of other apertures that register with the buttons of other types of mobile phones. For example, right and left side walls 120 and 125 may include apertures that register with other buttons of a mobile phone, such a volume control button, or the like.

According to one embodiment, holder 100 includes a set of spring-loaded louvers 140, 141, 142 for holding mobile phone 300 in opening 135 to inhibit the mobile phone from moving about of the holder while also accommodating mobile phones with a variety of different size protective cases. In addition to the louvers, embodiments include an adjustment wedge mechanism that uses the force of gravity to hold the phone in place and push the phone forward against the front wall. While holder 100 is described as including three louvers 140a, 140b, 140c the holder 100 may include more or fewer louvers for holding mobile phone 300 in opening 135.

Figure 5:
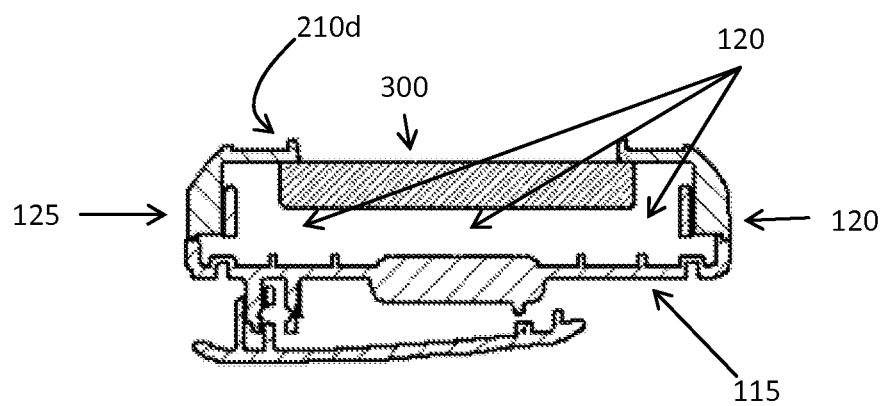
FIG. 5 is a simplified cross section top view of the acoustic impedance-matching concept.

FIG. 5 shows a top view of the holder 100 with the mobile phone 300 inserted. When the mobile phone is pressed forward it forms a cavity 120 of air between the mobile phone and the rear wall 115 and left 125 and right 120 walls. The sound comes from below. Ideally the cavity should have a greater cross-section volume at the top relative to the bottom. This air cavity 120 constrains the sound to make an effective acoustic horn. This creates more energy transfer of sound from the mobile phone's loudspeaker to the air.

Figure 6A:
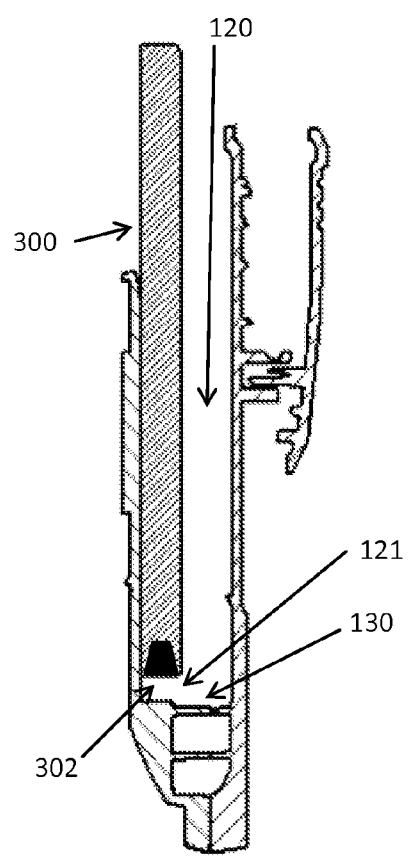
FIG. 6A is a simplified cross section side view of the acoustic impedance-matching concept for downward firing loudspeaker.

FIG. 6A shows a simplified schematic a cross section side view to show the method to improve the acoustic coupling of the mobile phone's loudspeaker 302 from the port of the mobile phone loudspeaker 302 to the top of the holder. The mobile phone is held slightly above the bottom interior wall to create a gap 121 that ranges from 1 millimeter to 3 millimeters. This narrow gap 121 dramatically improves the acoustic impedance match between the loudspeaker and the top of the holder. This allows the loudspeaker 302 to output sound more efficiently. The interior of the device is not obviously the shape of an acoustic horn, but it performs the main function of an acoustic horn. A problem with the shape of the horn is that it will be highly resonant at certain frequencies where the shape will have resonant modes. The resonant modes may be in the range of 2000 Hz to 4000 Hz. This can make the sound feel somewhat "tinny". To solve this problem the resonance is tuned by providing ports 143 showing in FIG. 3 in the rear wall to let out a portion of the sound. These ports, when positioned and sized appropriately, will reduce or eliminate an offending resonant mode while still providing improvement in the overall energy transfer of sound from the loudspeaker to outside the holder.

Figure 6B:
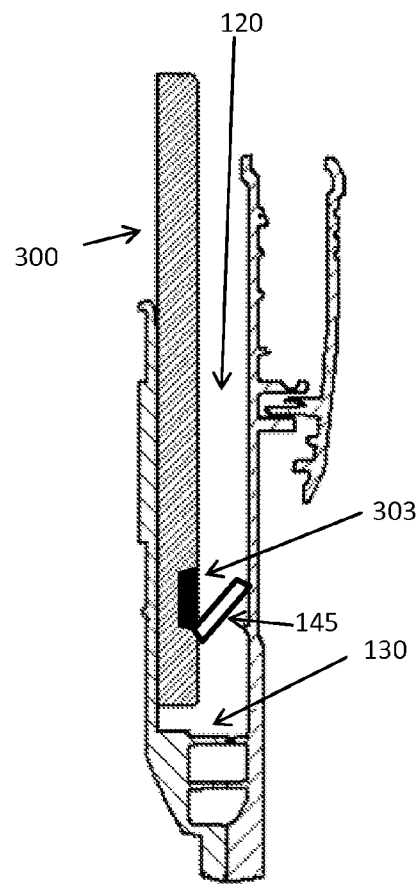
FIG. 6B is a view with a back firing loudspeaker.

FIG. 6B shows an alternate arrangement. In many mobile phones the speakerphone loudspeaker 303 is oriented to fire out the back of the mobile phone. In this case, a wiper 145 is used to narrow the space and to direct the sound upward.

Figure 7:
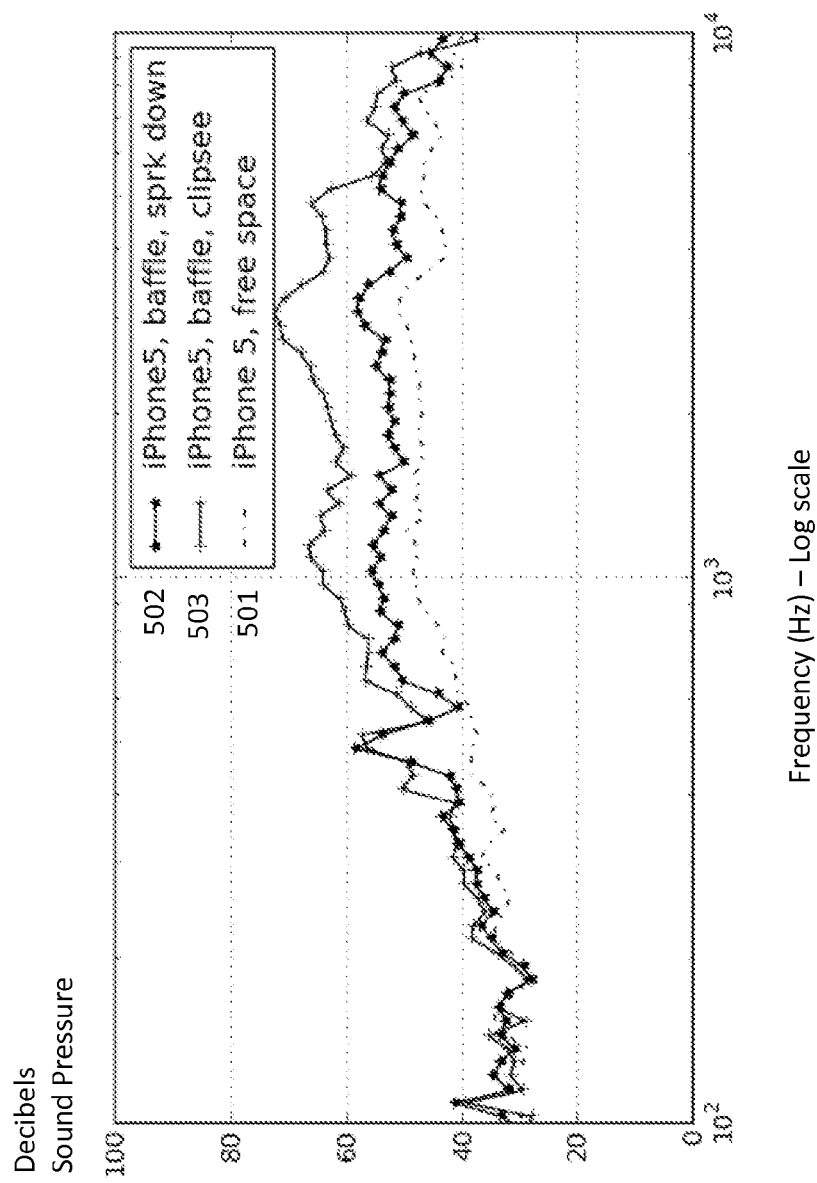
FIG. 7 is a graph that shows the typical improvement of the acoustic performance.

FIG. 7 shows the frequency response of an iPhone 5 in three different configurations. In each case, the measurement point is at 0.5 meters from the port of the loudspeaker above the mobile phone. Curve 501 is the response of the loudspeaker when the iPhone 5 is held in free space; Curve 502 is the response of the loudspeaker when the iPhone 5 is held against a baffle (to simulate a user's chest while measuring at the equivalent distance of the user's ears); Curve 503 is the response when the iPhone 5 is inserted into the holder. This curve 503 shows that the acoustic impedance matching technique of the holder improves the loudness of the iPhone 5 between 700 Hz to 6000 Hz. At 1000 Hz the improvement due to a baffle is approximately 5 dB, while the improvement due to both the baffle and the holder is another 9 dB for a total increase of 14 dB at 1000 Hz.

Figure 8:
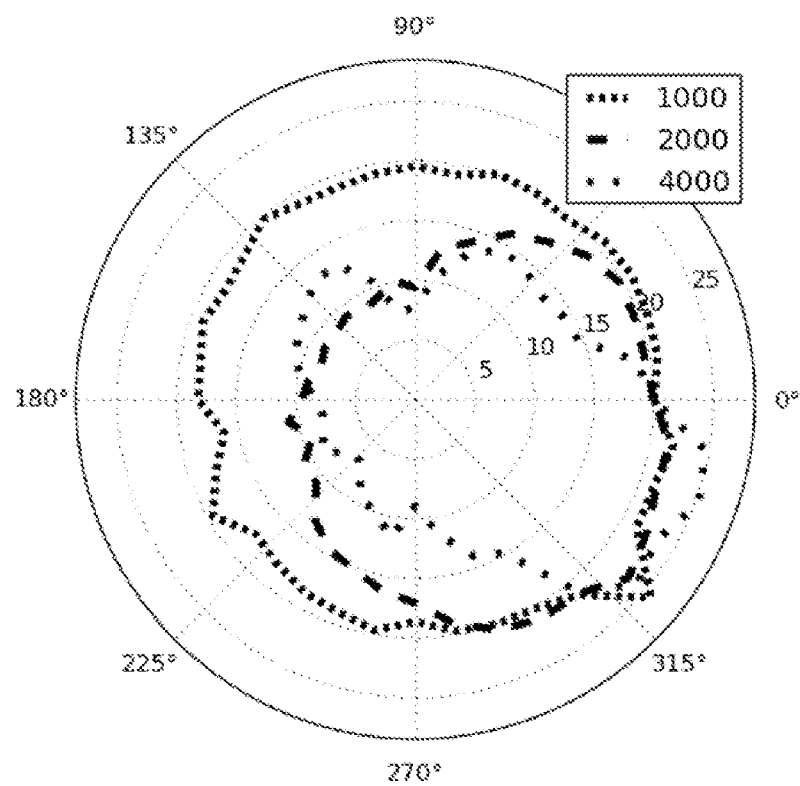
FIG. 8 is a graph that shows typical directionality in the form of a polar plot.

FIG. 8 shows a polar plot at selected frequencies 1000 Hz, 2000 Hz, and 4000 Hz. The 0 degree direction is toward the user's head. The plot shows that most of the sound energy is directed upward toward the user's head. The magnitude axis is sound pressure level in decibels.

Figure 9:
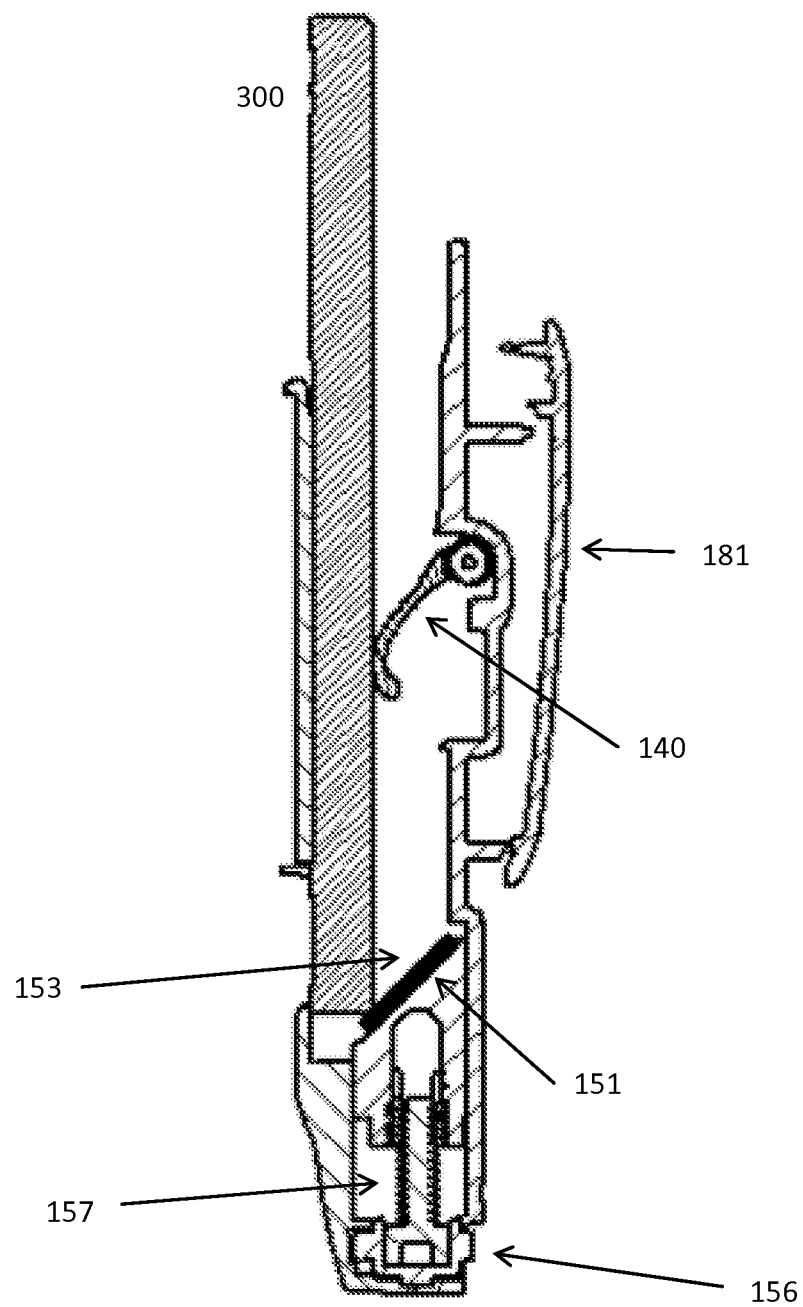
FIG. 9 is a simplified cross section side view showing the positioning mechanisms.

FIG. 9 shows a simplified schematic of a cross section side view to show the mechanisms that hold the mobile phone 300 in position. In this view, near the top, there is a spring-loaded center louver 140 that forces the mobile phone 300 forward. Near the bottom is a wedge 151, described in more detail below that forces the phone forward by using the gravity of the phone itself to slide forward as gravity pulls the phone down on the wedge 151. Further, the wedge 151 is adjusted by an adjustment mechanism comprising a screw 155 and interior threads 152 inside the wedge 151 to move the wedge up and down.

The wedge assembly, shown in FIG. 9, includes a plastic wedge with interior threads, and an elastomer pad 153, and a screw that includes a threaded shaft 157 and a dial 156 to allow for easy finger adjustment. In this embodiment the dial 156 is held captive so that the dial 156 remains in the same vertical position while it is allowed to rotate axially. The screw goes into the threads of the wedge and causes the wedge to move up and down as the screw is turned by the user's fingers. The elastomer pad 153 provides a high friction surface that resists movement of the mobile phone when the home button of the mobile phone (an iPhone 5 in this embodiment) is pressed. When the wedge 151 is high a very slender or case-free phone will be in the proper position. To allow for a very large protective case the wedge would be lowered. The position of the home button may be used as a guide to the user. When the wedge is adjusted to the correct height then the home button will align with the home aperture 138. This also positions the loudspeaker of the mobile phone to be approximately the correct height in relation to the bottom wall 130 of the holder 100.

Figure 10A:
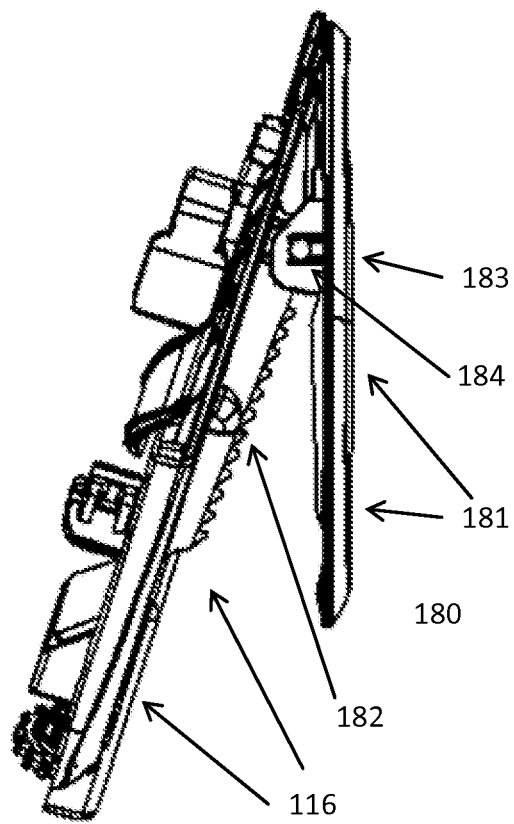
FIG. 10A, shows a side view of the latch match mechanism in the open position according to one embodiment.
Figure 10B:
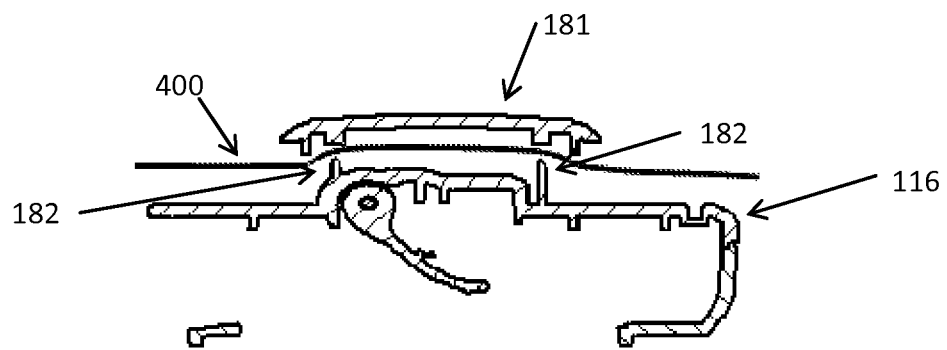
FIG. 10B, shows a simplified view that demonstrates the biting mechanism according to one embodiment.

FIGS. 10A and 10B shows two views of one embodiment of latch mechanism 180. In FIG. 10A, a side view of the latch attachment mechanism is shown with the latch in the open position. According to one embodiment, holder 100 may include a latch 180 for latching holder 100 to a seat belt 400, a user's garments, or the like. The latch, of the preferred embodiment, is operated as a spring-loaded clip. The user pinches the clip above the axle 184 and the clip opens below the axle. The rear housing 116 forms the second half of the clip. The rear housing 116 has two rows of teeth 182 that are used to grip onto the front side of the seat belt 400. The teeth 182 are oriented upward to resist upward movement that would be caused by withdrawing the mobile phone from the holder. In the downward direction the hinge 183 of the latch keeps the holder from slipping downward. The rear clip 181 portion does not have teeth. This creates a highly desirable feature that allows the user to gently press the latch forward in order to loosen it and move the holder up and down the seat belt without any teeth to snag onto the seat belt. Once the latch is closed then the seat belt is held firmly against the teeth. There are additional ribs 186 that run parallel to each row of teeth. These ribs 186 cause more gripping of the seat belt 400 to resist movement of the holder along the length of the seat belt.

Figure 11:
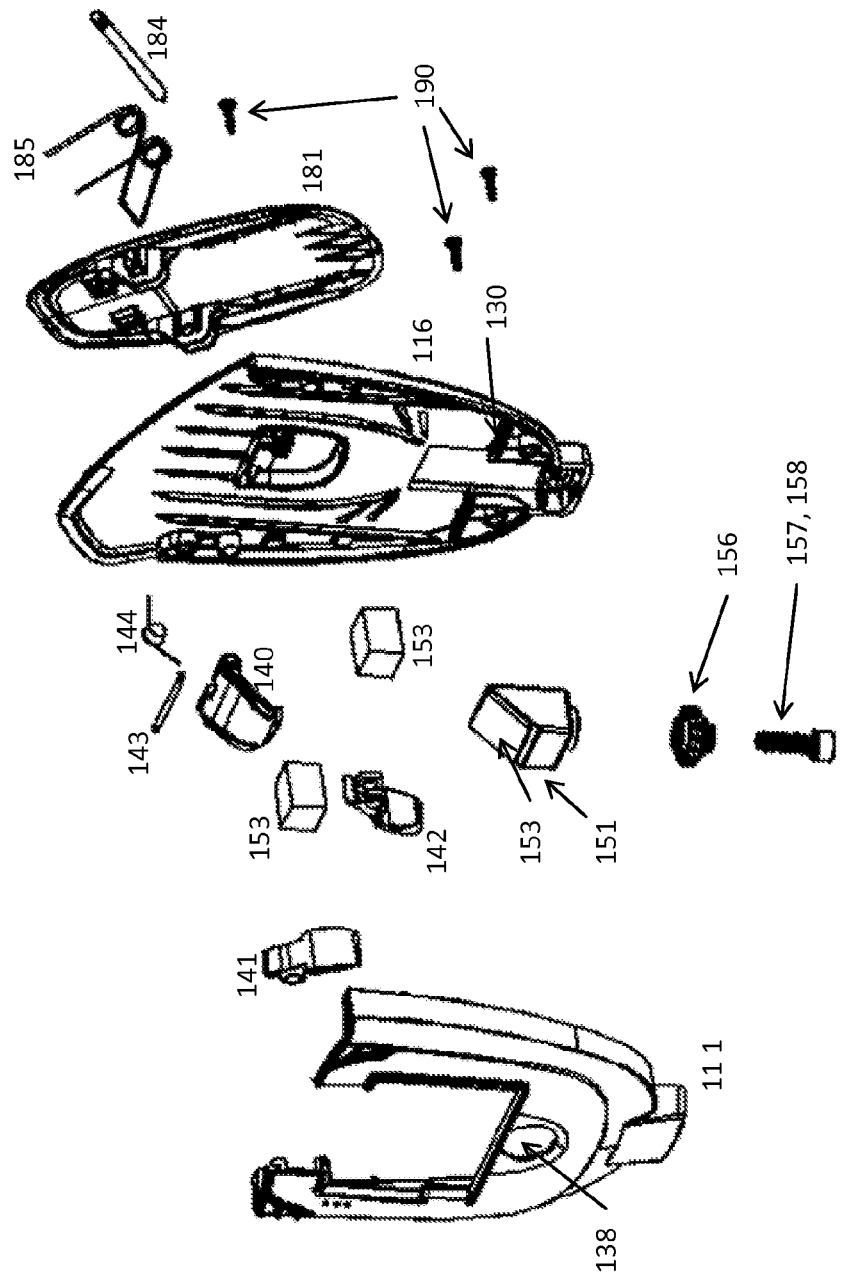
FIG. 11 is an exploded view of the holder according to one embodiment.

FIG. 11 shows an exploded view of one implementation of an embodiment according to the present disclosure. The front housing 111 and rear housing 116 go together to create the four walls of the interior of the body. The device contains two side louvers 141 and 142 and one center louver 140 to hold the mobile phone 300 in place. The specific parts are enumerated as follows: Front housing 111, rear housing 116, screw (consisting of dial 156, and cap head screw 158), wedge 151, elastomer pad 153, spring bar 143, torsion spring 144, rear clip 181, hinge 183, axle 184, dual torsion spring 185, and screws 190.

According to one embodiment, opening 135 has a depth (front to back) sufficient to receive a relatively thin mobile phone (e.g., about 7 millimeters to about 10 mm thick) or to receive a relatively thick mobile phone or a mobile phone with a case (for example, about 10 mm to about 16 mm thick). The louvers 140 may be configured to be push toward the front wall 110 to accommodate mobile phones and mobile phones with cases having these various thicknesses according to one embodiment.

According to one embodiment, right louver 141 and a left louver 142 are configured to apply right and left spring forces to the sides of mobile phone 300 to keep the mobile phone centered in holder 100 and to further securely hold the mobile phone in opening 135. According to one embodiment, the center louver is spring-loaded with a torsion spring.

Figure 12:
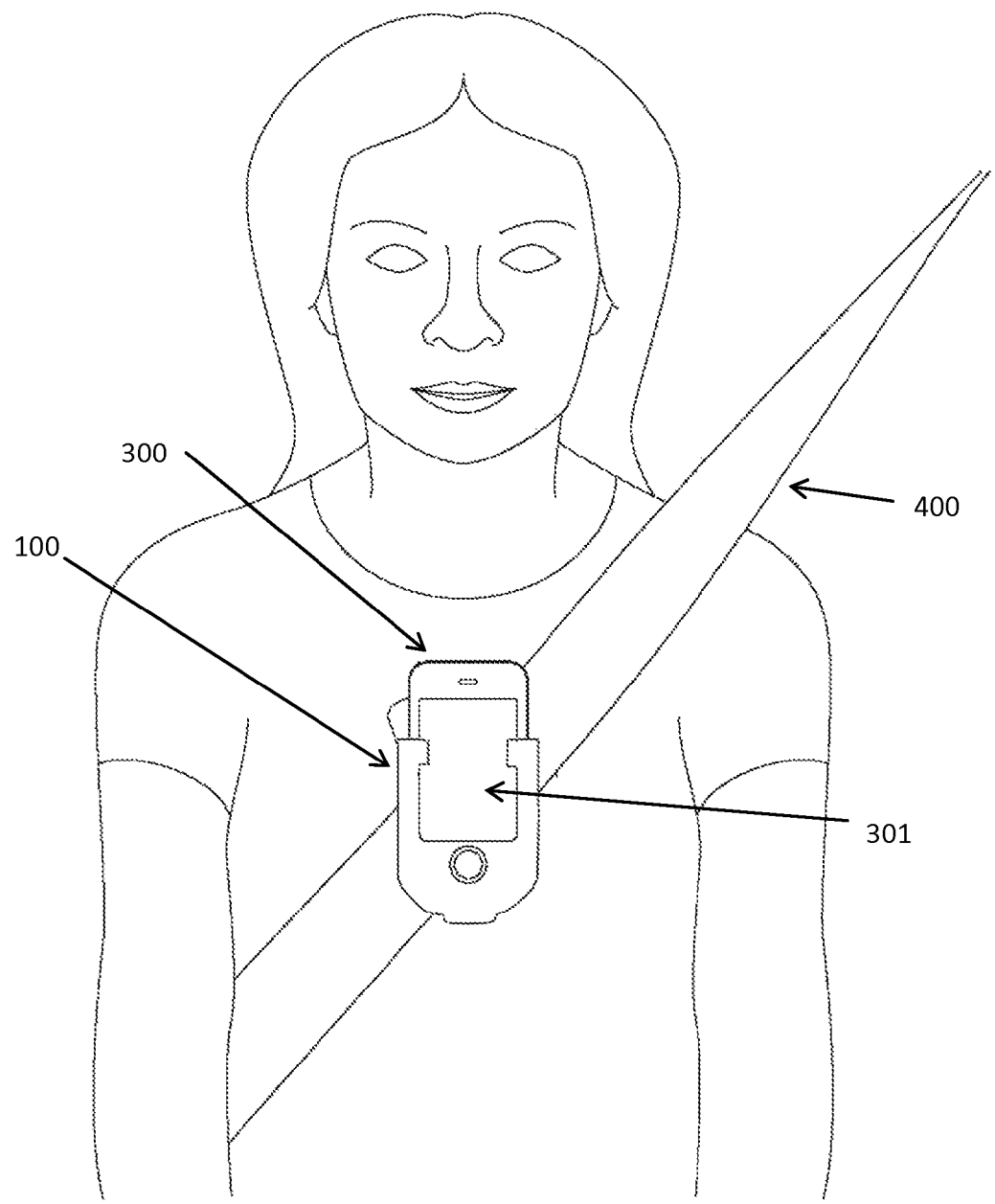
FIG. 12 is a simplified front view of the holder attached to a seat belt, which is over a user's chest and torso.
Figure 13:
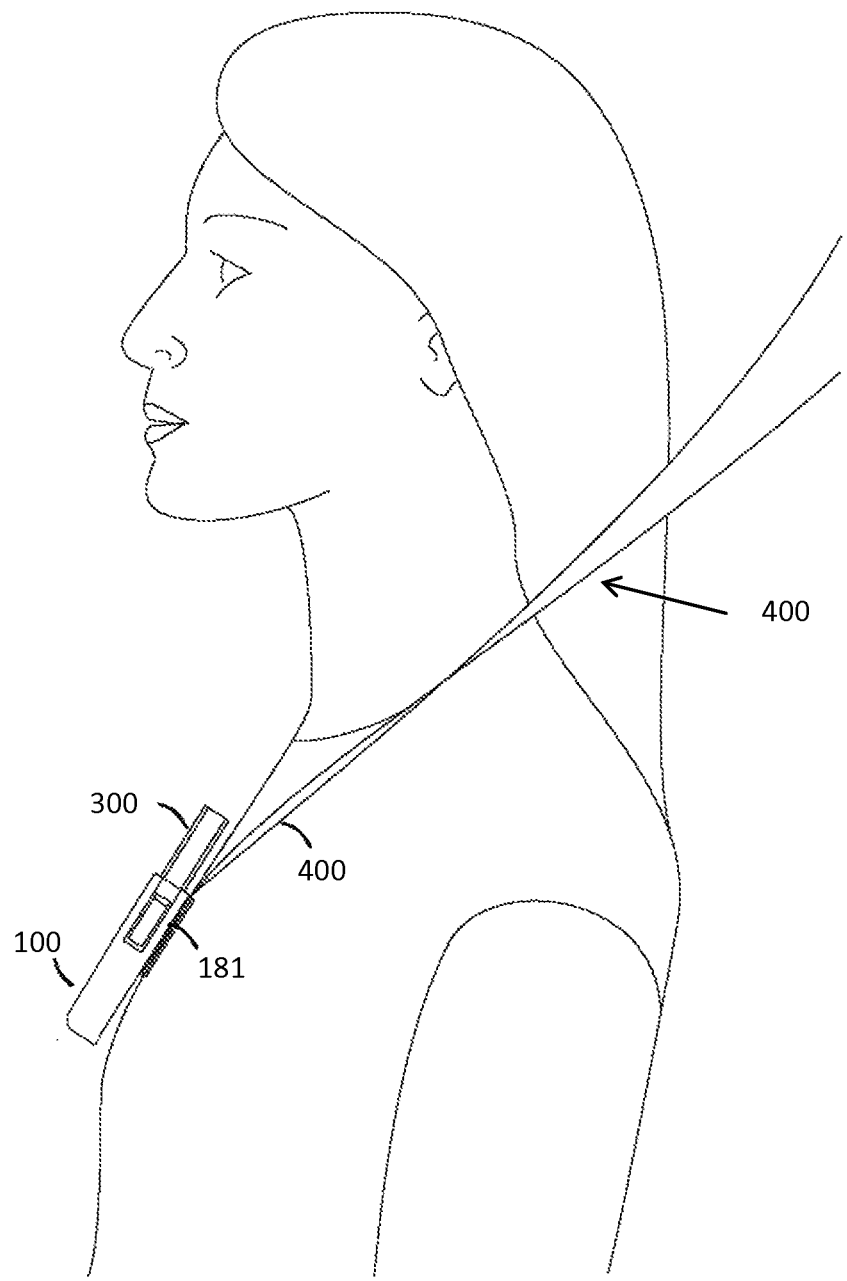
FIG. 13 is a simplified side view of the holder attached to the seat belt.

If holder 100 is located approximately at a user's chest or torso as shown in FIG. 12 and FIG. 13 (on a seat belt that is across a user's chest, on a lapel, on a placket, attached to a shirt pocket, etc.), then the acoustic pressure effectively doubles the sound pressure for most voice frequencies. The user's chest acts as a baffle, which is known to approximately double the sound pressure. Since the users chest is relatively large compared to most voice frequencies, it is an effective baffle even for low frequencies of voice. Since the opening is toward the user the sound is directional toward a user's head. With acoustic opening 135 generally directed toward a user's head, sound emitted by the holder is focused toward the user's head for improved sound detection by the user.

FIG. 12 shows a simplified front view of user with holder 100 attached to a seat belt 400, which is over a user's chest and torso. FIG. 13 is a simplified side view of a user with holder 100 attached to a seat belt 400. As shown in FIGS. 12 and 13, with holder 100 positioned at a user's chest, acoustic opening 135 opens up so that sound is generally directed up toward a user's head. This provides stronger sound toward the user's ears for improved sound detection of sound emitted by mobile phone 300.

Referring back to FIG. 1, according to one embodiment, holder 100 includes a set of finger guides 210a, 210b, 210c and 210d (collectively 210). A finger guide is a physical feature on holder 100 that may be felt by a user's finger to tactilely guide a user to touch a specific portion of mobile phone 300 with the mobile phone inserted into the holder. The finger guides may be configured to tactilely guide a user to a hard button or a soft button icon on the screen of the mobile phone. A hard button is a traditional button, such as a mechanical button, an electromechanical button, or the like. A soft button icon is a button icon displayed on a touch screen and may be activated by touch. Finger guide 210a may be utilized as a call-answer finger guide.

In one embodiment, the finger guides are composed of a fence 210d that prevents the user's fingers from accidentally touching the screen at an undesired spot on the screen. The fence is only high enough to give a tactile barrier to the user's fingers. A height of 1-2 millimeters is approximately sufficient for this purpose.

Finger guide 210a may include an opening in the fence 210d around the screen and the lower portion of the same screen barrier. Finger guide 210a may be adjacent to the slide-to-unlock button (a type of screen button) displayed on a mobile phone (such as an iPhone™ an Android™ phone, etc.) to tactilely guide a user to touch the slide-to-unlock button for unlocking the mobile phone to answer a call. A slide-to-unlock button 312, as is well known in the art, is an icon that is typically swiped with a finger to answer a call on a mobile phone where the initial lock screen is displayed after the mobile phone receives a call.

Finger guide 210b may be a speakerphone finger guide and may be configured to be adjacent to a speakerphone soft button 310 of mobile phone 300. Finger guide 210b is shown in FIG. 1A as a rounded indentation in the front wall, but may have a variety of alternative shapes. The set of finger guides provides for answering up calls using the sense of touch, without having to look at the mobile phone. For example, to answer a call, a user may: i) feel for the first finger guide to locate the slide-to-unlock button 312; ii) swipe the slide-to-unlock to unlock the mobile phone and answer the call; iii) feel for the second finger guide for turning on the speakerphone option; and iv) thereafter press a speakerphone button for placing the mobile phone in speakerphone mode. For some types of mobile phone, the set of finger guides further provide for placing calls without looking at the mobile phone. Suppose, for example, the mobile phone has speech recognition for placing call. A user may, using touch, search for the first finger guide for unlocking the phone, swipe the slide-to-unlock button indicated by the first finger guide, and thereafter speak call information for placing a call. Once the call is placed, the user may use touch to search for the second finger guide for turning on the speakerphone option, and thereafter press a speakerphone button screen icon 310 for placing the mobile phone in speakerphone mode.

Finger guide 210c may be a mute-button finger guide and may be configured to be adjacent to a soft mute button 311 of mobile phone 300. In some embodiments, finger guide 210c may have a unique texture or feature to differentiate the mute function from the speakerphone function. In the preferred embodiment, three small bumps that resemble Braille dots are used to distinguish this feature. These bumps provide a mildly negative cognitive mental operation for placing the mobile phone is mute mode where mobile phone's microphones are turned off. It will be appreciated that shapes other than bumps may be used. While the set of finger guides 210 is described herein as including four finger guides 210a, 210b, 210c, 210d the set of finger guides may include fewer or more guides, such as finger guides for volume control buttons or the like.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the disclosure as defined by the claims.

Advantages and Technical Effect

A problem that is solved by embodiments of the present disclosure is to allow for the mobile phone to be inserted and removed with a single hand and very little effort. It is important that the driver should not need to remove both hands from the steering wheel at any time. Embodiments allow a mobile phone with a protective case to fit inside the device securely, but still is removable with one hand. The protective case may have many different sizes ranging from minimal, or no case, to a case that may increase the overall thickness of the mobile phone by twice the thickness of the bare mobile phone. Therefore, in order for the product to be useable by owners with differing size cases, the device must accommodate a wide range of sizes. In principle, all the variation could be accommodated by spring-loaded louvers, or by elastomer or foam material, but there are two very important and competing requirements: 1) the phone must be held to the front with sufficient force that a finger press on one of the front buttons not dislodge the phone from position, and 2) the phone must be held only with sufficient force that it can be easily removed with one hand. In order to achieve this goal the adjustable wedge mechanism was invented. Many mobile smart phones have hard buttons at the front and bottom of the phone. In the case of the iPhone mobile phones, there is a single button. The force to cause the hard button to activate is substantial and on the order of the equivalent of 0.200 newtons or about 200 grams-force. If a spring mechanism were used to hold the phone forward then it would be very tight and almost impossible to remove from the holder with a single hand. Embodiments utilize a wedge to use the weight of the phone to push the phone forward toward the front. A typical mobile phone weighs about 120 grams. By covering the wedge with a soft elastomer pad, the bottom edge of the mobile phone deforms a small amount of the elastomer pad which prevents the mobile phone from sliding up even if the hard button is pressed with more than 200 grams-force. In the embodiment described here the wedge has a slope of 45 degrees. If the wedge had zero friction, then the resistance of a button press would only be 120 grams-force. The additional resistance is caused by the friction of the elastomer pad. The friction-coefficient of the elastomer pad can greatly exceed unity because the elastomer can deform.

It would only be necessary to have a fixed wedge to hold the phone forward and resist a button press if there was only one size phone and case. In order to allow for different size cases the wedge is adjustable. By turning the dial a screw turns which moves the wedge up or down. For a very large case, the wedge is moved downward. This mechanism can be adjusted by the user to visually align the button features of the smart phone with the corresponding finger guides. Another desirable aspect of the adjustment mechanism is that the actual phone, not including case, stays approximately in the same position relative to the interior floor of the holder. This keeps the acoustic performance fairly constant despite the different size cases.

A further technical advantage of the invention is the location of the mobile phone's microphone to the user's body. As seen in FIG. 13, the mobile phone is held relatively close to the user's chest. Typical modern mobile phones have a microphone near the top of the mobile phone to use while in speakerphone mode. The invention puts the top of the mobile phone near the user's mouth. This improves the speech-to-noise ratio compared to other speakerphone holders. The location of the top microphone relative to the user's chest improves the sound pickup. Most of the frequencies that come from the talker's mount propagate in all directions with slightly more energy going forward from the user's mouth. However, a microphone held below the user's mouth still picks up most of the user's voice with some small attenuation at higher frequencies above approximately 3 kHz. The sound from the user's mouth arrives by two paths: 1) directly from the talker's mouth, and 2) indirectly by reflection off the talker's chest. As long as the difference in arrival of each path is less than about one-fourth of the wavelength, then there will not be destructive interference of the sound and the sound pressure received by the microphone will be approximately doubled. This further enhances the sound pickup by the microphone.

A practical advantage of the invention is that the acoustic amplification of sound does not require a tight seal between the acoustic "horn" and the sound source. In most implementations where an acoustic horn is utilized to amplify the sound, the implementations utilize a tight seal to connect the acoustic horn to the sound source. In the invention, there is no spot where sound can significantly escape so most sound is forced through the cavity formed by the mobile phone and back of the holder so that there is no problem with sound escaping. This makes the invention much less sensitive to variations in case sizes.

We claim the following:

1. A holder for a mobile phone comprising:
 a body having an opening at the top to receive a mobile phone and having a bottom;
 a latch coupled to the body for positioning the holder with the opening up;
 a plurality of walls including a front wall, side walls, and a rear wall, the front wall having an opening that aligns with a display of the mobile phone; and
 a biasing mechanism that presses the mobile phone against the front wall to create a cavity between the rear of the mobile phone and the back of the holder, where the top of the cavity is open to constrain sound to propagate from near the bottom of the mobile phone through the top so as to define an acoustic horn which can amplify the sound and make the sound propagate primarily in an upward direction.

2. The holder of claim 1 wherein the rear and side walls constitute a continuous curved wall.

3. The holder of claim 1, wherein the biasing mechanism includes an adjustable wedge disposed at the bottom of the holder and slopes downward from back to front so that gravity forces the mobile phone to the front.

4. The holder of claim 3, further comprising a visual feature positioned in alignment with a visual feature of the mobile phone to serve as an alignment target when adjusting the wedge.

5. The holder of claim 3, wherein the front wall of the body includes an aperture positioned for alignment with a control button of the mobile phone to provide the user with a visual target when adjusting the wedge.

6. The holder of claim 3 wherein the wedge includes an adjusting screw to adjust a position of the wedge, the adjusting screw comprising a threaded shaft and a head that is accessed by the user's fingers, the wedge having corresponding interior threads to receive the screw.

7. The holder of claim 1, wherein the biasing mechanism includes a wedge having a surface on which rests the mobile phone.

8. The holder of claim 7 wherein the wedge is an elastomer material or a foam pad.

9. The holder of claim 7 wherein the surface of the wedge is coated with a high friction coating or is textured to provide friction the mobile phone contacts the wedge.

10. The holder of claim 1, wherein the latch is configured to latch the holder to an automobile seat belt to hold the opening up and the sound emitting end up.

11. The holder of claim 1, wherein the latch is configured to latch the holder at a user's chest or torso, and the acoustic opening is configured to direct the sound toward a user's head.

12. The holder of claim 1, wherein the latch includes a spring-loaded clip.

13. The holder of claim 12, wherein the rear part of the body has teeth aligned with the clip, the clip having a relatively flat surface opposite to the teeth, so that the teeth bite by pressing into the front of the seat belt.

14. The holder of claim 13, wherein the teeth are tilted upward to bite into a seat belt preferentially to resist upward movement to prevent the body from moving upward in response to the user pulling the mobile phone out of the holder.

15. The holder of claim 1, wherein the latch includes a spring-loaded clip that is formed by a clip portion and the rear part of the body.

16. The holder of claim 1, wherein the rear wall includes openings formed therethrough and positioned to direct a portion of the sound out of the cavity to reduce resonant modes.

17. The holder of claim 1, wherein the body includes a set of tactile finger guides to direct the user's fingers to icons on the screen of the mobile phone, where there is also a tactile fence on the body around the perimeter of the opening to the screen so that the user cannot accidentally touch the screen except at openings in the wall that align with a meaningful icon.

* * * * *